United States Patent Office 3,713,009
Patented Jan. 23, 1973

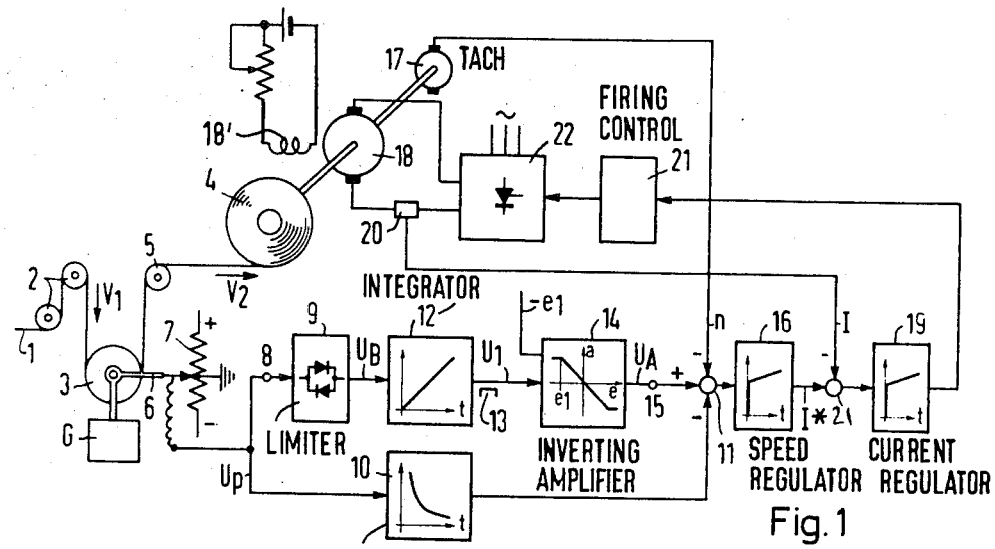
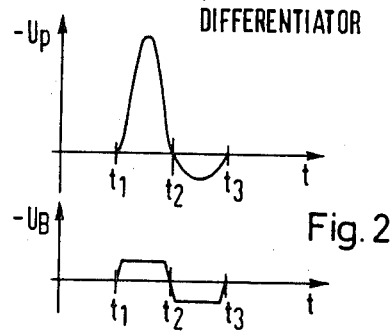
Fig. 2
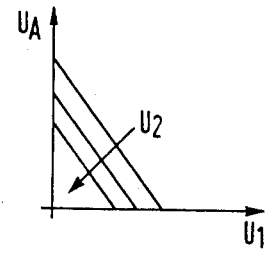
Fig. 4
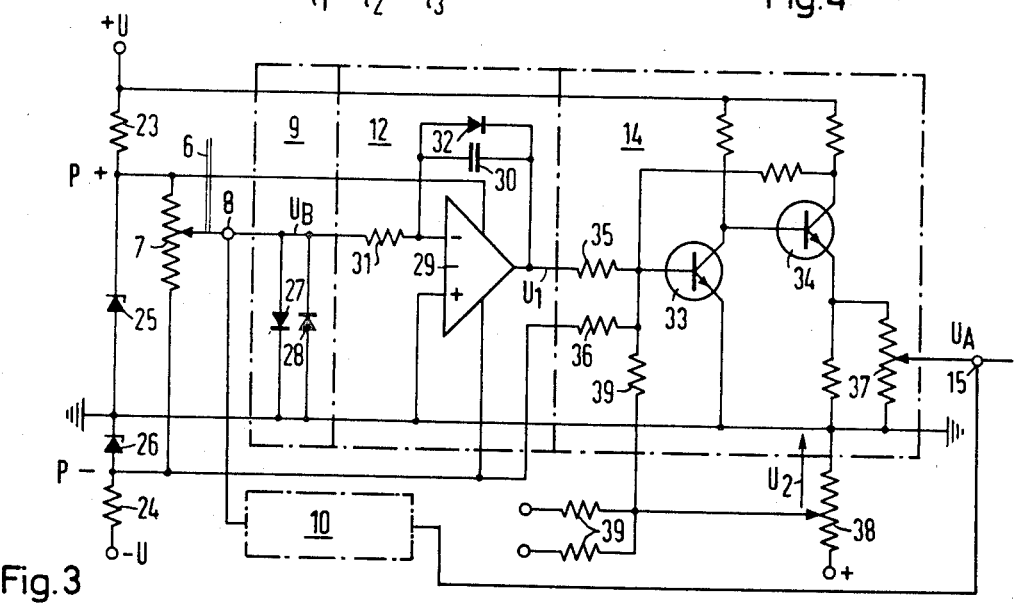
Fig. 3

3,713,009
SYSTEM FOR REGULATING THE SPEED OF AN AXIALLY DRIVEN WINDER DRIVE
Herbert Poppinger and Manfred Liska, Munich, Germany, assignors to Siemens Aktiengesellschaft, Berlin and Munich, Germany
Filed Nov. 12, 1970, Ser. No. 88,540
Claims priority, application Germany, Nov. 15, 1969, P 19 57 623.9
Int. Cl. B65h 59/38
U.S. Cl. 318—6                    7 Claims

ABSTRACT OF THE DISCLOSURE

A system for regulating the speed of an axially driven winder for textile and other thread or web material, which operates to maintain constant mechanical tension in the material being wound. The system comprises a winder motor of variable rotary speed and motor control means for varying the rotary speed. A dancer roller engageable with the material being wound, deflects from a given position when the pulling tension of the material, as it is being wound, departs from the desired value. Each deflection of the dancer roller causes the issuance of a voltage signal whose amplitude and polarity depend upon magnitude and direction of the dancer-roller deflection. An integrator and a differentiator are connected in parallel to the voltage signal and conjointly furnish a datum input to a speed regulator whose pilot input depends upon the rotary winder speed and whose output is connected to the motor control means for varying the rotary speed to maintain the pulling tension in the material at a constant value. An amplitude limiter is interposed between the integrator and the signal voltage means. A current regulator subordinate to the speed regulator is connected between the output of the speed regulator and the motor control means. The current controller derives its pilot magnitude from the current in the motor energizing circuit, the datum input of the current regulator being delivered by the output of the speed regulator.

Our invention relates to a system for regulating the speed of an axially driven winder for textile and other thread or web material.

It is a primary object of the invention to regulate the wind-up speed or driving torque of the axially driven winder in such a sense that the material is wound up under constant tension.

For regulating a uniform driving operation in a mercerizing machine, it is known to subject the web of material, as it runs through a lye bath between two clamping localities, to the weight of a pendulous roller commonly called "dancer roller" whose deflections from a normal position are used for varying the rotating speed of the motor for driving the web of material so that a continuous travel of material and consequently a constant pulling force will result. However, for employing such a rotary speed regulation for axially driven winders, several additional requirements must be taken into account. Among these is the necessity that relatively large inhomogeneities, as may occur randomly at any locality of the material, are coped with by a rapid and wide change in adjustment of the speed datum or pattern value for the axially driven winder. Another requirement is to take care of changing the rotary speed in accordance with the growing winding diameter and the accompanying wide changes in momentum of the drive. For these reasons, axially driven winders particularly pose the problem of securing, dynamic stability if the winding tension or linear winding speed is to remain constant; and it is accordingly another, more specific object of our invention to devise a speed regulating system for axially driven winders that satisfies these requirements.

Another, more specific object of our invention is to render, in an axially driven winder, the regulation of the linear wind-up speed substantially insensitive to short-lasting inhomogeneities, such as local changes in mechanical strength or thickness of the travelling material, and to rapidly and immediately counteract the effects of any such disturbances.

To achieve these objects, as well as those set forth hereinafter, and in accordance with a feature of our invention we provide an axially driven winder with a dancer roller which changes its position relative to a zero or other reference point in dependence upon the pulling tension in the material or upon its linear winding speed, and which controls a signal voltage to vary its amplitude and polarity in dependence upon magnitude and direction of the departure from the desired constant tension or speed; and we further connect between the speed regulator for the drive motor and the roller-controlled signal voltage two parallel circuit branches of which one contains a differentiator member directly responsive to changes in signal voltage, and the other parallel branch contains an integrator, the output voltages of the differentiating and the integrating members being both applied to the speed regulator as datum or pattern magnitude. According to another feature of the invention, we also connect an amplitude limiting member between the integrator and the roller-controlled signal voltage.

By virtue of such a circuit combination, representing in principle an ID member (integral differential member), an extremely stable regulation is secured; and by the fact that the amplitude of the input signal applied to the integrator is limited, any short-lasting fluctuations in homogeneity of the material being wound upon a take-up reel, or other short-lasting disturbances have no appreciable effect upon the median value of the speed datum value whereas on the other hand the system also functions to have such disturbances or fluctuations immediately counteracted by the effect of the differentiating member.

Further objects, advantages and features of our invention, said features being set forth with particularity in the claims annexed hereto, will be apparent from, and will be mentioned in, the following description of an embodiment of a regulating system according to the invention illustrated by way of example on the accompanying drawing, in which FIG. 1 is a schematic diagram of the complete system, FIG. 2 is an explanatory voltage-time graph relating to the same system, FIG. 3 shows circuit details of the system, and FIG. 4 is another explanatory graph relating to voltages occurring in the illustrated system.

The same reference numerals are applied in FIGS. 1 and 3 for corresponding components respectively. Relative to the terminology used in this specification and with respect to the servo-type of block diagrams shown in FIG. 1, reference may be had to the book "Feedback Control Systems" by Gille, Pelegrin and Decaulne, McGraw-Hill Book Co., New York, 1959 pages 7 to 22 and 771; to the book "Analysis of Feedback Control Systems" by Bruns and Saunders, McGraw-Hill Book Co., New York, 1955, pages 1 to 6, 208 and 226; and to U.S. patent Ser. No. 737,995 filed June 18, 1968.

An axially driven winder as shown in FIG. 1 is applicable in the manufacture of textile fibers for winding the thread after its production onto a take-up spool or reel. The thread 1 passes over two guide rollers 2, both having fixed axes, and forms a loop about a pendulous roller 3, hereinafter referred to as "dancer roller." The thread then passes over another guide roller 5 of a fixed rotational axis onto the take-up reel 4. The entering speed of the thread 1 is denoted by $V_1$, the wind-up speed at the periphery of the reel 4 by $V_2$. Located behind the guide roller 5 is a thread guide of the conventional kind (not shown) which periodically reciprocates the thread along the reel in a direction parallel to the reel axis in order to obtain a helical winding with predetermined intersection and direction-changing localities.

The rotary speed of the winder drive is to be so regulated that the linear delivery speed $V_1$ and the linear winding speed $V_2$ are identical, in which case the dancer roller 3 will remain at rest in a given position which is the one schematically illustrated in FIG. 1. Under these conditions, the winding tension is constant and is determined by the weight of the dancer roller 3 or also by any other weights G fastened to the dancer roller. While in FIG. 1 a gravity bias upon the dancer roller is assumed, it will be understood that a spring bias is likewise applicable in which case the dancer roller deflection may differ from the vertical direction.

It may be assumed, for example, that the pulling force exerted upon the thread 1 is due only to the winding torque which the winder drive imposes upon the reel 4. If the rotary speed of the reel 4 were constant, any difference between delivery speed $V_1$ and winding speed $V_2$ would be due only in homogeneity of the material or to some other disturbance ahead of the illustrated system so that, for example, the pull exerted by the winder drive would tend to lengthen the thread. However, even if the incoming thread is homogenous and does not cause a difference between speeds $V_1$ and $V_2$, the sped $V_2$ always tends to increase with an increasing reel diameter if the rotary driving speed were constant. Each of such possible occurrences, whether occurring separately or simultaneously, requires a regulation of the rotary driving speed; and such regulation comes about by the means and effects described presently.

Each positional change of the dancer roller 3 displaces the tap 6 of a potentiometer 7 connected to a supply of direct voltage denoted by "+" and "−". Under stationary conditions, that is as long as the speeds $V_1$ and $V_2$ are equal, the tap 6 assumes the illustrated given reference position on potentiometer 7 which position is shown grounded to indicate that normally the tap potential is zero.

The tap voltage $U_p$ of potentiometer 7 is connected with the input terminal 8 of a limiting stage 9 (FIGS. 1 and 3) and also with the input of a differentiating member 10 whose output voltage is supplied to a mixing or branching point 11 preferably constituted by an adding amplifier. The output voltage $U_B$ of the limiting member 9 is impressed upon an integrator 12 whose output voltage $U_1$ is unilaterally limited to the zero value by means of an amplitude limiting member 13 (FIG. 1). The member 13 is constituted, for example, by a diode as described hereinafter with reference to diode 32 shown in FIG. 3. The thus limited output voltage $U_1$ of integrator 12 is supplied to an inverting amplifier 14. The characteristic of amplifier 14, schematically represented in FIG. 1 by the appertaining block symbol, is such that the amplifier responds to a positive input signal "e" by issuing an amplified negative output signal "a" and vice versa. As will be further described with reference to FIG. 3, the inverting amplifier 14 receives a constant negative bias voltage $-e_1$ so that the output voltage of the inverting amplifier 14, beginning from a maximal value, decreases when the input voltage, constituted by the output voltage of the integrator 12, increases in the positive direction starting from zero. The output voltage $U_A$ at terminal 15 (FIGS. 1, 3) of the inverting amplifier 14 is likewise supplied to the branching point 11. The output signal of the branching point 11 constitutes the datum of pattern value for a speed regulator 16 which receives a pilot voltage, indicative of the real speed of the rotary drive motor, from a tachometer dynamo 17 coupled with the axial winder drive.

The speed regulator 16 is a PI-regulator (proportional integral regulator). The output signal of regulator 16 constitutes the datum or pattern value I* for a current regulator 19 subordinate to the speed regulator. The pilot or real value I of the current regulator 19 is supplied from a current transforming device connected in the armature circuit of the drive motor 18. The current transforming device 20, since the armature circuit is energized by direct current, may consist of an IR-drop resistor or a galvanomagnetic voltage converter as known, for example, from U.S. Pat. 2,946,955 of F. Kuhrt, the particular type of the current-voltage converter 20 being not essential to the invention.

The armature circuit of the drive motor 18 is energized by direct current furnished from three-phase rectifier 22 which has its three input buses connected to an alternating-current three-phase line. As symbolically shown at 22 in FIG. 2, the rectifier device 22 operates with thyratrons whose ignition grids receive firing voltage from a control set 21. The output voltage of the current regulator 19 is supplied to the firing control set 21 which then causes the rectified output voltage of the rectifier 22 to increase or decrease as required for regulating the armature current and hence the rotating speed of motor 18, the field winding 18' or the motor 18 receiving an adjusted constant excitation voltage.

In principle, the system so far described operates as follows:

Assume that initially the tap 6 of potentiometer 7 is in the illustrated reference position at which the tap voltage $U_p$ is zero and that the linear (peripheral) speed $V_2$ is identical with the supply speed $V_1$. Under these conditions the output voltage of the integrator 12 has a definite positive value which, upon being amplified in the inverting amplifier 14, determines the rotary speed value needed for this state of equilibrium. Now assume that the winding diameter on reel 4 increases so that the winding speed $V_2$ increases with no changes in rotary motor speed $n$. The dancer roller consequently will move upwardly. The output voltage of the integrator 12 therefore increases in the positive direction. This has the result of reducing the output voltage $U_A$ at terminal 15. As a consequence, the datum value for the rotary speed is reduced, and this performance continues until the output voltage of the integrator 12 ceases to change, that is until the tap voltage $U_p$ taken from the potentiometer 7 has returned to zero and accordingly the dancer roller has returned to the illustrated starting position.

The reverse performance will result if the delivery speed is instantaneously larger than the winding-up speed $V_2$.

Due to the action of the differentiating member 10, any sudden positional change of the dencer roller 13 is counteracted thereby aiding the integrator 12 in regulating against the positional deflection of the dancer roller. The arrangement composed of the stages 9, 10, 12 and 14 can be looked upon as being an ID-regulator, the differentiating time constant of the member 10 being generally chosen to be smaller by one order of decimal magnitude than the integrating time of the integrator 12.

By virtue of the inverting amplifier 14 the regulating system is immediately ready for operation at the beginning of a winding-up performance. The rotary speed of an axially driven winder must be largest when the winding operation commences; on the other hand, the output voltage of most integrators will drift to zero upon discontinuance of the feed voltage or when the output signal has been absent for a prolonged period of time. In contrast thereto, the system according to the invention as shown in FIG. 1 operates automatically in such a manner that a maximal datum value for the rotary speed is available at the beginning of a winding operation without the necessity of especially setting the integrator 12 for this purpose. The limit member 13 (FIG. 1), such as exemplified by the diode in FIG. 3, then takes care of securing the correct sense of regulation.

FIG. 2 serves to explain the operation of the amplitude limiting member 9 serving to prevent affecting the integrator output signal by short-lasting disturbances as manifested by rapid fluctuations of the dancer roller 3 about the zero or reference position. The upper graph in FIG. 2 represents such a disturbance as manifested by a corresponding course of the potentiometer tap voltage $U_p$, the ordinates in FIG. 2 representing voltage and the abscissas representing time ($t$). The graph is drawn for a time interval between moments $t_1$ and $t_3$. By means of the limiting member 9, the amplitudes of the spurious voltages can be limited to such a small value that the median value of the output voltage $U_B$ of member 9 is substantially equal to zero and consequently cannot appreciably affect the output signal of the integrator 12, especially in cases where the integrator 12 has a long integrating time characteristic compared with the extremely short duration of the spurious voltage fluctuation.

FIG. 3 shows in detail the circuitry applicable for the ID-regulator represented in FIG. 1. The terminals of the feed voltage supply are denoted by $+U$ and $-U$. Two resistors 23, 24 and two Zener diodes 25, 26 of the same breakthrough voltage rating are connected in series between terminals $+U$ and $-U$. The point between the two Zener diodes 25, 26 is grounded. Hence, ground-symmetrical potentials obtain between at the points denoted by $P+$ and $P-$. The potentiometer 7 of the dancer roller is connected between these two points and so are the feeder lines of an amplifier 29 which forms part of the integrator 12. The amplitudes of the voltages occurring at the terminal 8 are limited symmetrically to the ground or zero potential by the threshold voltages of two diodes 27 and 28 which conjointly constitute the above-mentioned limiting member 9. The thus limited voltage amplitudes are supplied to the input of the integrator 12.

As mentioned, the amplifier 29 forms part of the integrator 12. This requires a negative feedback which, in the illustrated example, extends through a capacitor 30. The integrating time is determined by the mathematical product of the negative feedback capacitance 30 times the input resistance 31. The output voltage $U_1$ of the integrator 12 is limited by the above-described limiting device 13 (FIG. 1) which, in the example of FIG. 3, is constituted by a diode 32 connected in parallel relation to the capacitor 30. The output signal of the integrator 12, therefore, can assume only values up to the very slight threshold voltage of the diode 32, usually about 0.7 volt, so that the output voltage $U_1$ of the integrator 12 is virtually limited to the zero value.

The output voltage $U_1$ is supplied through a resistor 35 to the base of a transistor 33 in an emitter connection. This transistor forms the input stage of the inverting amplifier 14 and has its collector connected with the base of another transistor 34 connected as an emitter follower. The collector voltage of transistor 34 is feedback-coupled to the base of the input transistor 33. A bias voltage is applied through a resistor 36.

A potentiometer 37 is provided for adjusting the maximal output voltage $U_A$ to the operating conditions of the individual winder drive. If several winder drives according to the invention operate in parallel relation to one another, and if a simultaneous variation of the maximal output voltage $U_A$ for each of these drives is required, then a further potentiometer 38, also shown in FIG. 3, is preferably added and receives feed voltage from the positive pole of the voltage source. The tap of potentiometer 38 is connected through respective individual resistor 39 with the inputs of the inverting amplifiers in the individual winder drive systems.

FIG. 4 represents schematically the change in output voltage $U_A$ in dependence upon the output voltage $U_1$ of the integrator 12, the tap voltage $U_2$ of the potentiometer 38 being applied as the parameter in the graph. It will be recognized that, with an increasing tap voltage $U_2$, there will occur a parallel displacement of the characteristic. Consequently, the potentiometers 37 can be so set that the maximal datum value required at the beginning of the winding-up performance is selectable at will or can be varied for the individual winder drives of a multi-drive system.

Upon a study of this disclosure it will be understood by those skilled in the art that a regulating system for an axially driven winder according to the invention permits of various modifications with respect to details and may be given embodiments other than particularly illustrated and described herein, without departing from the essential features of our invention and within the scope of the claims annexed hereto.

We claim:

1. A system for regulating the speed of an auxiliary driven winder drive for textile and other thread or web material, comprising a winder motor of variable rotary speed and motor control means for varying said rotary speed, said motor control means comprising a motor energizing circuit and a current controller in said circuit; a dancer roller engageable with the material being wound and deflectable from a given position when the pulling tension of the material being wound departs from a given value; direct-voltage signal means having a variable signal voltage whose magnitude and sense are dependent upon magnitude and direction of the deflection of said dancer roller; an integrator and a differentiator having respective inputs connected in parallel to said variable signal voltage means, an amplitude limiter being interposed between said integrator and said signal voltage means; a speed regulator having a pilot input dependent upon the rotary winder speed and having a datum input connected to the outputs of both said integrator and said differentiator so that the datum for said speed regulator is conjointly determined by the output signals of both said integrator and said differentiator, said speed regulator having an output and circuit means connecting said speed regulator output to said motor control means for varying the motor energizing current thereby varying the motor rotary speed to maintain said pulling tension constant.

2. In a regulating system according to claim 1, said circuit means comprising a current regulator interposed between said speed regulator and said current controller of said energizing circuit, said current regulator having a datum input connected to said speed-regulator output and having a real-current input connected to said motor energizing circuit, said current regulator having an output connected to said current controller of said motor energizing circuit, said current regulator having an output connected to said current controller of said motor energizing circuit.

3. A system for regulating the speed of an axially driven winder drive for textile and other thread or web material, comprising a winder motor of variable rotary speed and motor control means for varying said rotary speed; a dancer roller engageable with the material being wound and deflectable from a given position when the pulling tension of the material being wound departs from a given value; direct-voltage signal means having a variable signal voltage whose magnitude and sense are dependent upon magnitude and direction of the deflection of said dancer roller; an integrator and a differentiator having respective inputs connected in parallel to said variable signal voltage means, an amplitude limiter being interposed between said integrator and said signal voltage means, said integrator comprising asymmetrically conducting means for unilaterally limiting the integrator output signal to zero; a speed regulator having a pilot input dependent upon the rotary winder speed and having a datum input connected to the outputs of both said integrator and said differentiator so that the datum for said speed regulator is conjointly determined by the output signals of both said integrator and said differentiator, said speed regulator having an output connected to said motor control means for varying the motor rotary speed to maintain said pulling tension constant and an inverting amplifier interposed between said integrator and said speed regulator.

4. A system for regulating the speed of a plurality of simultaneously operable axially driven winder drives with individually complete speed regulating systems for textile and other thread or web material, each speed regulating system comprising a winder motor of variable rotary speed and motor control means for varying said rotary speed; a speed regulator having a datum input, a pilot input dependent upon the rotary winder speed, and an output connected to said motor control means for varying the motor rotary speed; a dancer roller engageable with the material being wound and deflectable from a given position when the winding speed of the material departs from the delivery speed; direct-voltage signal means having a reversible signal voltage whose magnitude and polarity depend upon the amount and direction of the deflection of said dancer roller from said position; an integrator and a differentiator connected in parallel between said direct-voltage signal means and said datum input of said speed regulator so that the datum value for said speed regulator is conjointly determined by the output signals of both said integrator and said differentiator; an inverting amplifier interposed between said integrator and said speed regulator; a potentiometer having an adjustable tap voltage; and respective resistors each of which is connected between said tap voltage and the input of one of said respective inverting amplifiers.

5. A system for regulating the speed of an axially driven winder drive for textile and other thread or web material comprising a direct-current winder drive motor having a rotor circuit, alternating-current supply means, a thyristor rectifier device connecting said rotor circuit with said supply means and having firing control means for varying the armature voltage to thereby control the rotary speed of said motor, said rotor circuit comprising a current-responsive member having a voltage dependent upon the current of said circuit; a dancer roller engageable with the material being wound and deflectable from a given position when the winding tension of the material departs from a given value; direct-voltage signal means having a reversible signal voltage dependent upon direction and amount of said deflection of said dancer roller; an integrator and a differentiator connected in parallel to said signal voltage means; a speed regulator having a pilot input dependent upon the rotary winder speed and having a datum input connected to the respective outputs of said integrator and differentiator so that the datum value for said speed regulator is conjointly determined by the output signals of both said integrator and said differentiator, said speed regulator having an output connected to said firing control means for controlling said thyristor rectifier device to vary the motor rotary speed so as to maintain a constant linear winding speed; an a current regulator interposed between said speed regulator and said firing control means, said current regulator having a datum input connected to said speed regulator output and having a real-current input connected to said current-responsive member, said current regulator having an output connected to said firing control means.

6. A system for regulating the speed of an axially driven winder drive for textile and other thread or web material comprising a direct-current winder drive motor having an armature circuit, alternating-current supply means, a thyristor rectifier device connecting said rotor circuit with said supply means and having firing control means for varying the armature voltage to thereby control the rotary speed of said motor; a dancer roller engageable with the material being wound and deflectable from a given position when the winding tension of the material departs from a given value; direct-voltage signal means having a reversible signal voltage dependent upon direction and amount of said deflection of said dancer roller; an integrator and a differentiator connected in parallel to said signal voltage means; a speed regulator having a pilot input dependent upon the rotary winder speed and having a datum input connected to the respective outputs of said integrator and differentiator so that the datum value for said speed regulator is conjointly determined by the output signals of both said integrator and said differentiator, said speed regulator having an output connected to said firing control means for controlling said thyristor rectifier device to vary the motor rotary speed so as to maintain a constant linear winding speed; and an amplitude limiter stage interposed between said integrator and said signal means.

7. A system for regulating the speed of an axially driven winder drive for textile and other thread or web material comprising a direct-current winder drive motor having an armature circuit, alternating-current supply means, a thyristor rectifier device connecting said rotor circuit with said supply means and having firing control means for varying the armature voltage to thereby control the rotary speed of said motor; a dancer roller engageable with the material being wound and deflectable from a given position when the winding tension of the material departs from a given value; direct-voltage signal means having a reversible signal voltage dependent upon direction and amount of said deflection of said dancer roller; an integrator and a differentiator connected in parallel to said signal voltage means; a speed regulator having a pilot input dependent upon the rotary winder speed and having a datum input connected to the respective outputs of said integrator and differentiator so that the datum value for said speed regulator is conjointly determined by the output signals of both said integrator and said differentiator, said speed regulator having an output connected to said firing control means for controlling said thyristor rectifier device to vary the motor rotary speed so as to maintain a constant linear winding speed; an amplitude limiter stage interposed between said integrator and said signal means, said integrator comprising asymmetrically conducting means for unilaterally limiting the integrator output signal to zero; and an inverting amplifier interposed between said integrator and said speed regulator.

References Cited

UNITED STATES PATENTS

| | | | |
|---|---|---|---|
| 2,990,484 | 6/1961 | Jones | 310—94 |
| 3,465,276 | 9/1969 | Silva et al. | 318—621 X |
| 3,606,201 | 9/1971 | Petusky | 318—7 X |
| 3,416,058 | 12/1968 | Hill et al. | 318—6 X |

OTHER REFERENCES

Industrial Electronics, Hodgskiss, September 1968, pp. 350–353.

BERNARD A. GILHEANY, Primary Examiner

F. E. BELL, Assistant Examiner

U.S. Cl. X.R.

318—7